(12) United States Patent  
Nagane et al.

(10) Patent No.: US 7,056,084 B2  
(45) Date of Patent: Jun. 6, 2006

(54) STEAM TURBINE

(75) Inventors: Kohei Nagane, Kanagawa-ken (JP); Katsuya Yamashita, Tokyo (JP); Yukio Shinozaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 10/849,552

(22) Filed: May 20, 2004

(65) Prior Publication Data

US 2005/0022527 A1    Feb. 3, 2005

(30) Foreign Application Priority Data

May 20, 2003    (JP)    ............................. 2003-142125

(51) Int. Cl.
*F01D 9/02*    (2006.01)
(52) U.S. Cl. ...................... 415/116; 415/178
(58) Field of Classification Search ................ 415/115, 415/116, 178, 191
See application file for complete search history.

(56) References Cited

U.S. PATENT DOCUMENTS

| | | | | |
|---|---|---|---|---|
| 1,490,907 A | * | 4/1924 | Baumann | 415/194 |
| 1,908,066 A | * | 5/1933 | Sedlmeir | 239/132.3 |
| 2,494,328 A | * | 1/1950 | Bloomberg | 415/191 |
| 2,815,645 A | * | 12/1957 | Downs | 415/112 |
| 2,855,178 A | * | 10/1958 | Forsyth et al. | 415/194 |
| 3,277,652 A | * | 10/1966 | Brown | 60/658 |
| 6,102,654 A | | 8/2000 | Oeynhausen et al. | |
| 6,237,338 B1 | | 5/2001 | Magoshi et al. | |

FOREIGN PATENT DOCUMENTS

| | | |
|---|---|---|
| DE | 3042782 A1 | 6/1982 |
| EP | 1050666 A2 | 11/2000 |
| JP | 58-113501 A | 7/1983 |
| JP | 8-338205 A | 12/1996 |
| JP | 9-177505 A | 7/1997 |
| JP | 9-317405 A | 12/1997 |
| JP | 11-350911 A | 12/1999 |

OTHER PUBLICATIONS

U.S. Appl. No. 10/835,593, filed Apr. 30, 2004, Yamashita et al.

* cited by examiner

*Primary Examiner*—Edward K. Look
*Assistant Examiner*—Nathan Wiehe
(74) *Attorney, Agent, or Firm*—Foley & Lardner LLP

(57) ABSTRACT

A steam turbine that can effectively operate with the steam at the higher temperatures, while maintaining the strength of turbine constituent components despite the high steam temperature of the steam is provided. The steam turbine includes a casing, a rotor, a plurality of turbine stages, a steam pass, a nozzle box, and a cover plate. The rotor is rotatably installed in the casing. The turbine stages are disposed in the turbine, at least one of the turbine stages including a turbine nozzle and including a moving blade that is fixed to the rotor. The steam pass includes the turbine stages. The nozzle box is placed in a space between the casing and the rotor for providing a heated steam into the steam pass. The cover plate is arranged along an outer surface of the nozzle box.

26 Claims, 9 Drawing Sheets

STEAM TURBINE

CROSS REFERENCE TO RELATED APPLICATION

This application is based upon and claims the benefit of priority from prior Japanese Patent Application No. 2003-142125 filed on May 20, 2003, the entire contents of which are incorporated herein by reference. In addition, the present application is related to co-pending application Ser. No. 10/835,593 entitled "STEAM TURBINE, STEAM TURBINE PLANT AND METHOD OF OPERATING A STEAM TURBINE IN A STEAM TURBINE PLANT," filed on Apr. 30, 2004, having the same inventors as the present application, and the entire contents of that co-pending application is incorporated by reference.

FIELD OF THE INVENTION

This invention relates to a steam turbine, and in particular a steam turbine that permits operation with an increased steam temperature.

DESCRIPTION OF THE BACKGROUND

Recently, for steam turbine plants, increasing the temperature of steam has been discussed to improve the thermal efficiencies of plants.

Conventional steam turbine plants generally introduce a one-stage reheating configuration using reheated steam. In the steam turbine plant with the one-stage reheating configuration, steam at a temperature of about 1000 degrees Fahrenheit is used for a high pressure turbine, while steam at a temperature of 1000 or 1050 degrees Fahrenheit is used for an intermediate pressure turbine as reheated steam.

According to the Rankine cycle, which is a thermal cycle generally used in a steam turbine plant, when the steam temperature is increased, the plant thermal efficiency can be more improved.

A conventional high pressure turbine and intermediate pressure turbine for a steam turbine plant is described in Japanese Patent Application (Kokai) No. 11-350911. In this publication, the intermediate pressure turbine uses steam at a temperature about 1100 degrees Fahrenheit as reheated steam, the turbine having a reheated steam supply tube with a steam-cooled double-tubing structure.

However, such a system cannot effectively operate with a temperature of the reheated steam above about 1300 degrees Fahrenheit (or about 700 degrees Celsius), and there remain problems to be solved.

To supply such high temperature steam in a steam turbine, one area of investigation is adopting a nozzle box, including in an intermediate pressure turbine.

A nozzle box is a chamber for steam that is supplied from a boiler or the like, and supplies the steam to turbine stages in the turbine. A nozzle box preferably also functions to avoid constituent components surrounding the nozzle box from direct exposure to high temperature steam.

Conventionally, a high pressure steam turbine has a nozzle box positioned at an inlet side of the steam; however, it is designed to maintain its strength when the steam is at a temperature of 1050 to 1100 degrees Fahrenheit. it is difficult for a conventional nozzle box to maintain its strength with steam at a temperature of 1300 degrees Fahrenheit or above. Further, for such high temperature steam, a radiation problem is to be considered. When adopting steam at about 1300 degrees Fahrenheit, a heat transfer by radiation is not negligible because the temperature of outer surfaces of the nozzle box becomes high. The radiation heat will undesirably heat up constituent components, such as a casing and a turbine rotor, that are provided around the nozzle box.

SUMMARY OF THE INVENTION

Accordingly, an advantage of an aspect of the present invention is to provide a steam turbine that can effectively operate with the steam at the higher temperatures, while maintaining the strength of turbine constituent components despite the high temperature of the steam.

To achieve the above advantage, one aspect of the present invention is to provide a steam turbine that may comprises a casing, a rotor rotatably installed in the casing and having a first space formed therebetween, a plurality of turbine stages disposed in the turbine, at least one of the turbine stages including a turbine nozzle and including a moving blade that is fixed to the rotor, a steam pass including the at least one turbine stage, a nozzle box, positioned in the first space between the casing and the rotor, for providing a heated steam to the steam pass, and at least one cover plate positioned adjacent to an outer surface of the nozzle box, to cover at least a portion of the nozzle box.

Further features, aspects and advantages of the present invention will become apparent from the detailed description of preferred embodiments that follows, when considered together with the accompanying figures.

DETAILED DESCRIPTION OF THE PREFERRED EMBODIMENTS

Figure 1:
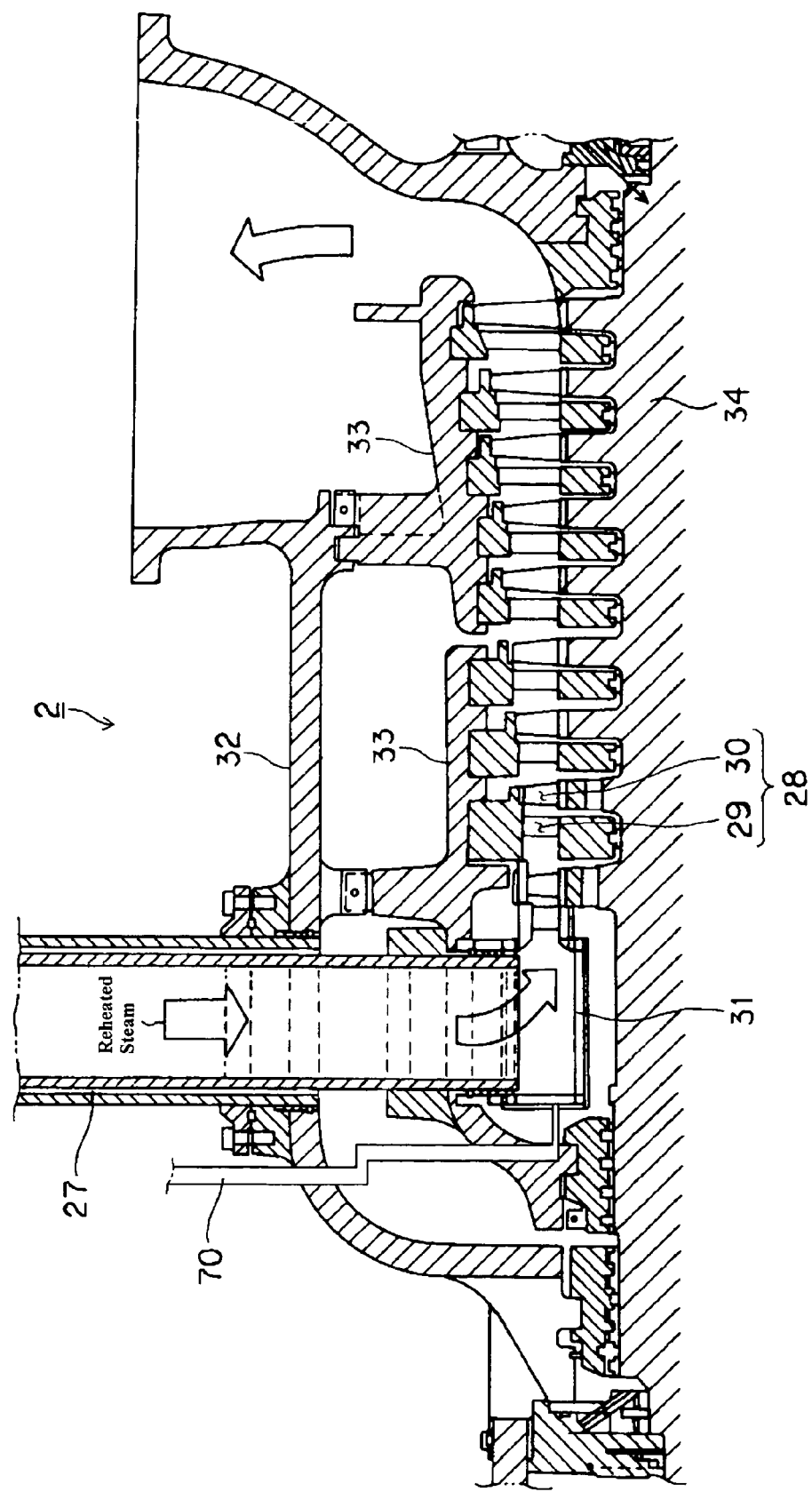
FIG. 1 is a schematic vertical cross sectional view showing an embodiment of a steam turbine according to the present invention.

An embodiment in accordance with the present invention will be explained with reference to FIGS. 1 to 14. FIG. 1 is a schematic vertical cross sectional view showing an embodiment of a steam turbine according to the present invention. This embodiment depicts an example of applying a steam turbine according to the present invention to an intermediate turbine of a steam turbine plant.

As shown in FIG. 1, an intermediate pressure turbine 2 has a double casing structure including an outer casing 32 and an inner casing 33. A turbine rotor 34 is rotatably installed in inner casing 33. Turbine rotor 34 has a plurality of moving blades 30. Inner casing 33 supports a plurality of nozzles 29 by a nozzle diaphragm in its inside portion.

Nozzle 29 and moving blade 30 are arranged adjacent to each other radially along the center axis of turbine rotor 34. A turbine stage 28 includes one nozzle 29 and one moving blade 30. A plurality of the turbine stages 28 are provided as a steam pass, which is a pathway of high temperature steam introduced to intermediate pressure turbine 2.

A nozzle box 31 is provided in a space between turbine rotor 34 and inner casing 33, as it surrounds turbine rotor 34. Intermediate pressure turbine 2 has a steam inlet tube 27, which supplies high temperature steam, which is reheated steam in this example, to the nozzle box 31. Nozzle box 31 is preferably a steam chamber that supplies high temperature steam from steam inlet tube 27 to turbine stages 28 that form a steam pass for the steam to pass through. Cooling steam is supplied to nozzle box 31 by cooling steam line 70.

Figure 2:
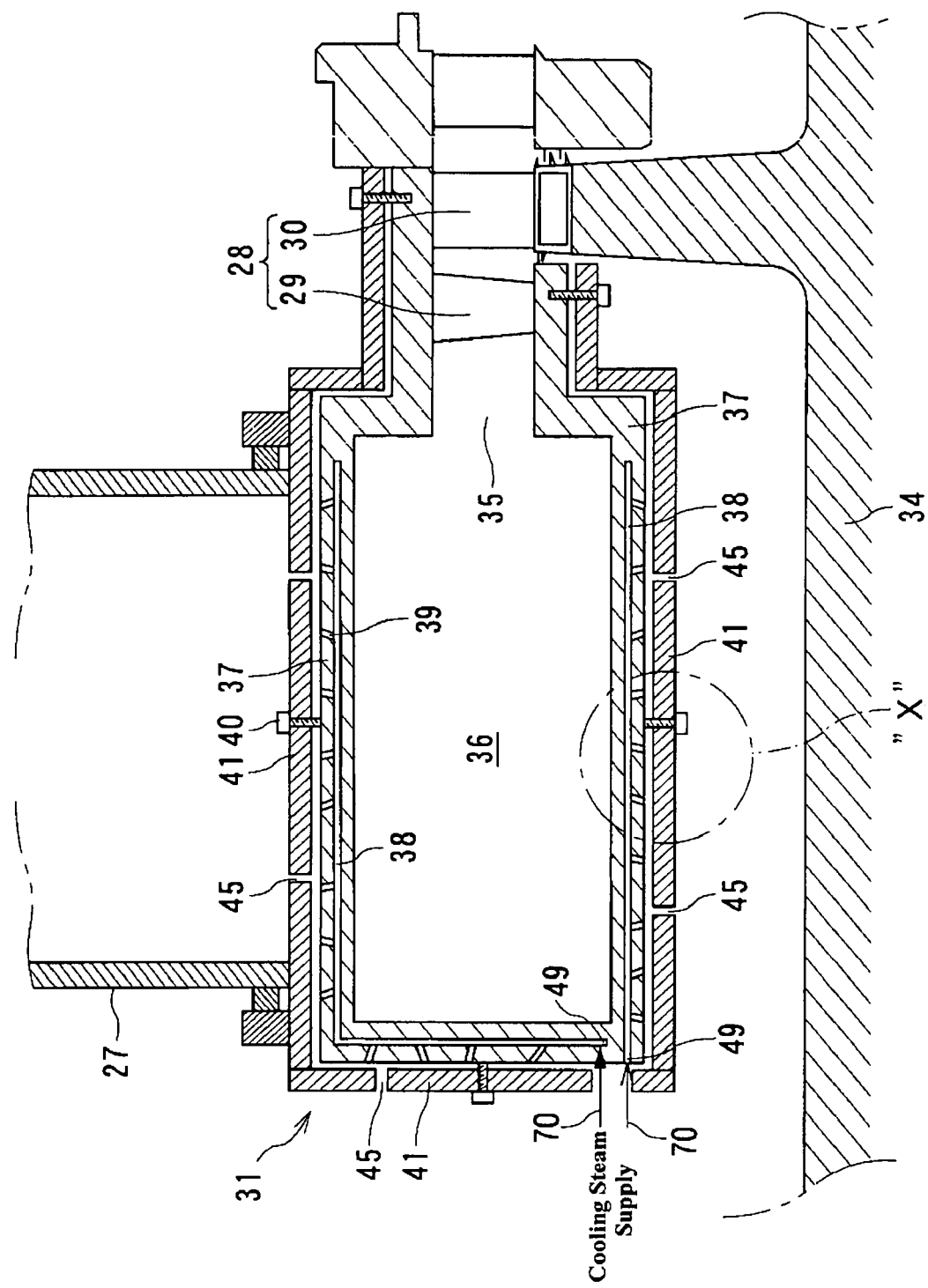
FIG. 2 is a schematic cross sectional view showing a nozzle box according to the embodiment of a steam turbine.
Figure 3:
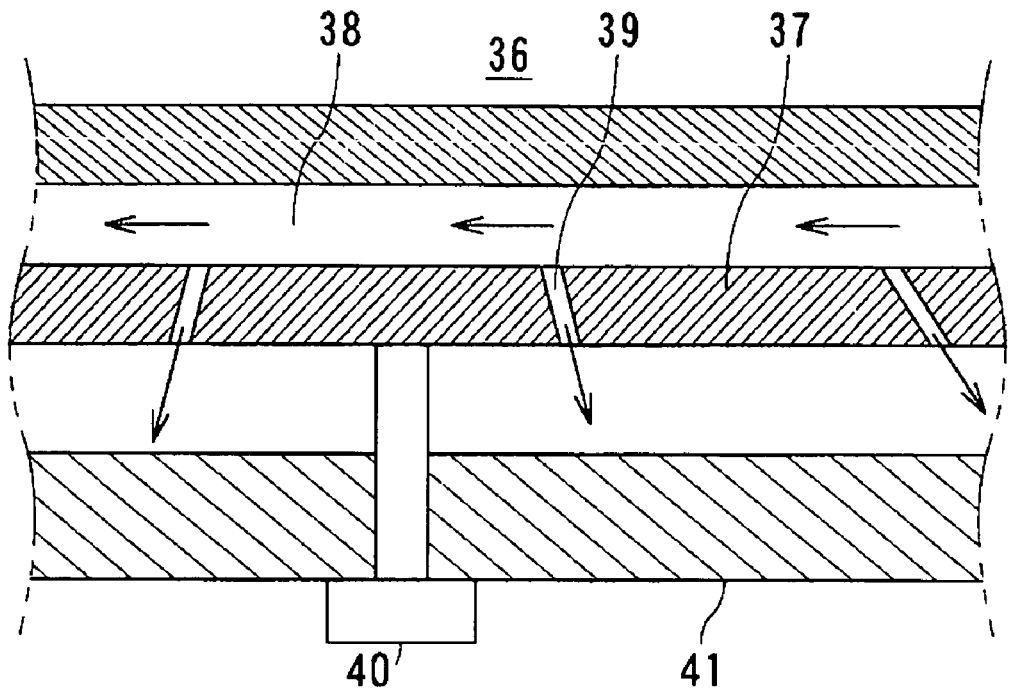
FIG. 3 is an enlarged schematic sectional view showing the nozzle box at portion "X" in FIG. 2.

FIG. 2 shows, in a cross sectional view, a more detailed depiction of the nozzle box 31 of the intermediate pressure turbine 2 according to the embodiment of the invention. FIG. 3 is an enlarged schematic sectional view at portion "X" of FIG. 2.

As shown in FIGS. 2 and 3, nozzle box 31 has a square or rectangular-like shape in a cross section, surrounded by a wall 37. The wall surrounds is a steam chamber 36.

Steam supply tube 27 is connected to an upper face, which is a outer circumferential face, of the wall 37 of nozzle box 31. To supply high temperature steam to turbine stages 28, a nozzle port 35 is formed in another face of wall 37 that leads to turbine stage 28. A cooling steam path 38 is formed within the wall 37 (alternatively, the wall 37 could be formed of multiple separate layers, with a cooling steam path therebetween). A cooling steam inlet 49, which supplies the cooling steam into cooling steam path 38, is provided in wall 37. Cooling steam outlet ports 39 are formed in wall 37, which are openings that pass the cooling steam in the cooling steam path 38 through and outside wall 37. A cooling steam supply line 70 is connected to cooling steam inlet 49.

A plurality of cover plates 41 are arranged along an outer face of wall 37 of nozzle box 31. Cover plates 41 are supported by a support 40 (such as a screw or other known mechanical fastener), and a space is formed between walls 37 of nozzle box 31 and the cover plates 41. In other words, support 40 fixes cover plates 41 at a predetermined distance from wall 37. In this embodiment, cover plates 41 are arranged to cover the whole surface of nozzle box 31, but leaving cooling steam outlet openings 45. In other words, cover plates 41 intermittently cover the whole of nozzle box 31. A cooling steam outlet opening 45 is provided in cover plate 41 to pass the cooling steam in a space between walls 37 and cover plate 41 through outside of the cover plate 41. Cooling steam outlet opening 45 may be formed by utilizing a gap between adjacent cover plates 41 (or a hole formed in a given cover plate.).

For cover plate 41, a heat-resistant flat plate may be used. Since cover plate 41 is accommodated on nozzle box 31 by support 40, the material of the cover plate 41 may preferably be the same material of the nozzle box 31 taking into account thermal expansion of the material. One exemplary material is Austenite type alloy, such as SUS 310, may be used as cover plate, in light of its anti-oxidation properties.

As shown in FIG. 3, the cooling steam, which is supplied to cooling steam path 38 from cooling steam inlet 49, cools the wall 37 while it flows inside steam path 38. The cooling steam then flows out from steam path 38 toward cover plates 41 via cooling steam outlet ports 39, and finally flows outside of cover plates 41 via cooling steam outlet openings 45, and toward, for example, turbine rotor 34.

Figure 4:
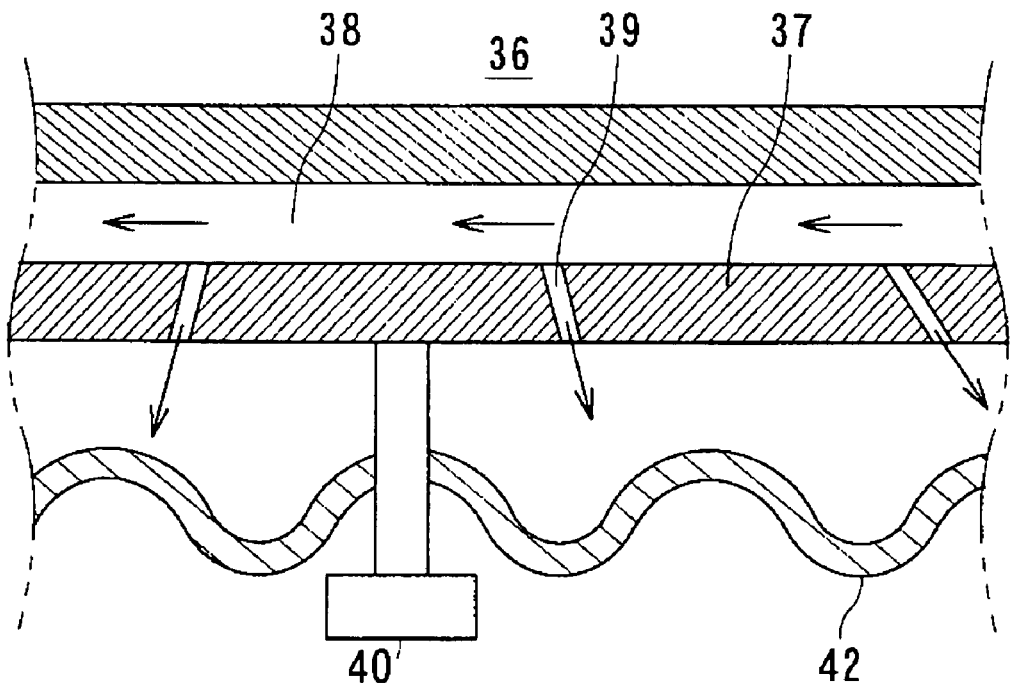
FIGS. 4 to 6 are enlarged schematic sectional views showing possible modifications of the nozzle box of the embodiment of the invention.
Figure 5:
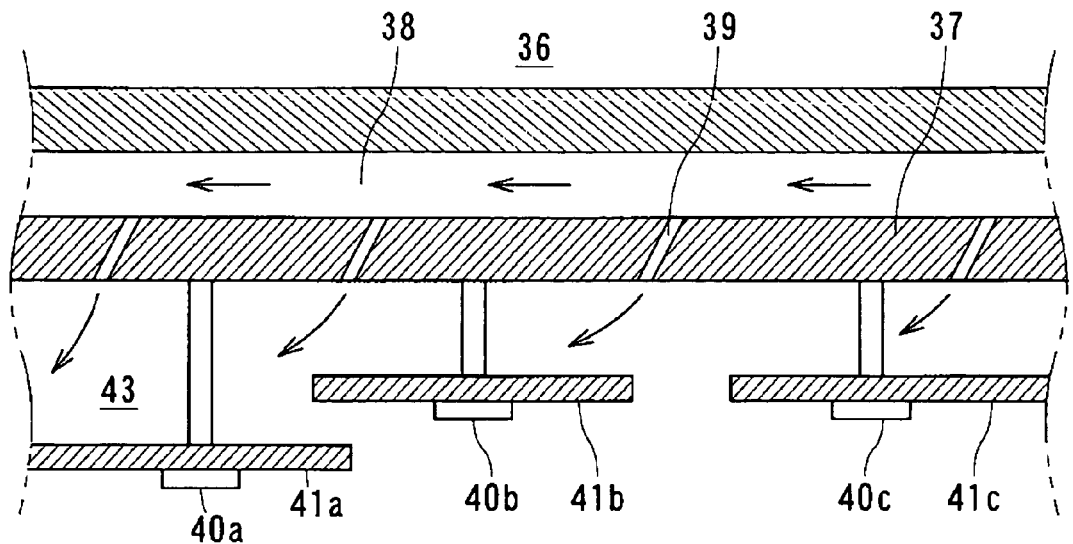

While the cover plate 41 shown in FIG. 3 is a flat plate, it may alternatively be a wave-shaped plate 42 as shown in FIG. 4. FIG. 4 is an enlarged schematic sectional view as FIG. 3 for a corresponding portion "X" of FIG. 2, but where a wave-shaped plate 42 is used in the embodiment. Wave-shaped plate 42 as the cover plate may not only effectively absorb a thermal expansion of the cover plate caused by high temperature, but may also improve a heat transfer coefficient because it has a larger surface area than the flat plate.

In this embodiment, cover plates 41 are supported and arranged by supports 40 at a same distance from wall 37 of the nozzle box 31. As shown an FIG. 5, an alternative is to arrange some cover plates 41a with a respective support 40a at a larger distance from wall 37 than other cover plates 41b and 41c, which are supported by respective supports 40b and 40c In this modification, the pressure of the cooling steam, which flows out from cooling steam outlet port 39 at a portion of cover plate 41a, may be recovered more than at other portions.

Figure 6:
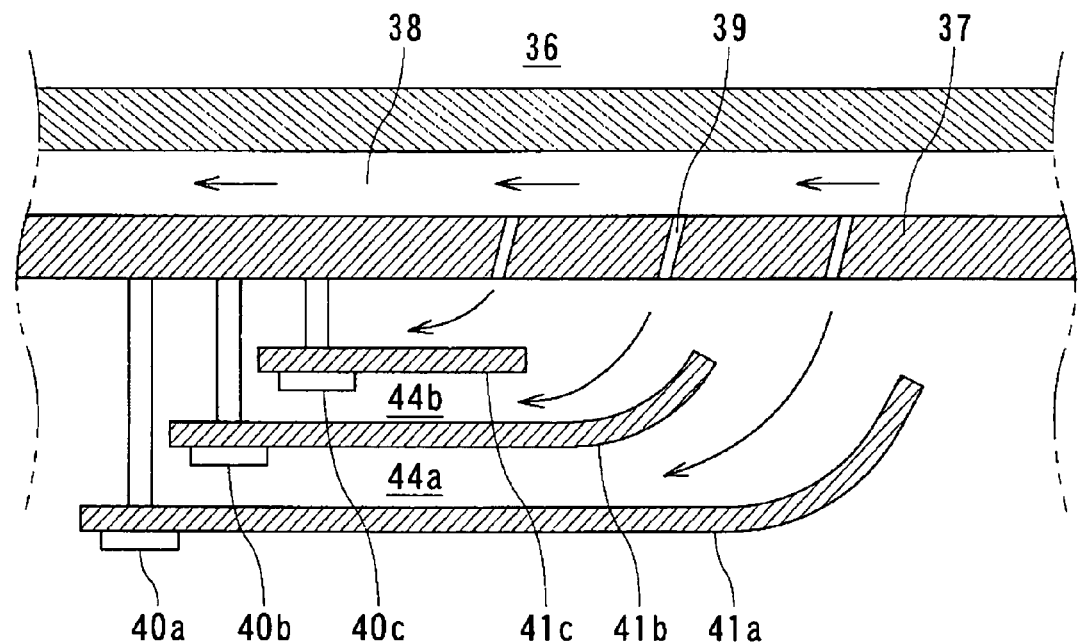

Further, as shown in FIG. 6, cover plates 41c, 41b, and 41a may be overlapping arranged as with gradually enlarged distances from the wall 37 (including possibly overlapping) by supports 40c, 40b, and 40a. This may form layers of the cover plates 41c, 41b, and 41a outside the wall 37, which can be used as additional cooling steam paths 44a and 44b as the cooling steam from cooling steam outlet port 39 cools both faces of cover plates 41b and 41c.

Figure 7:
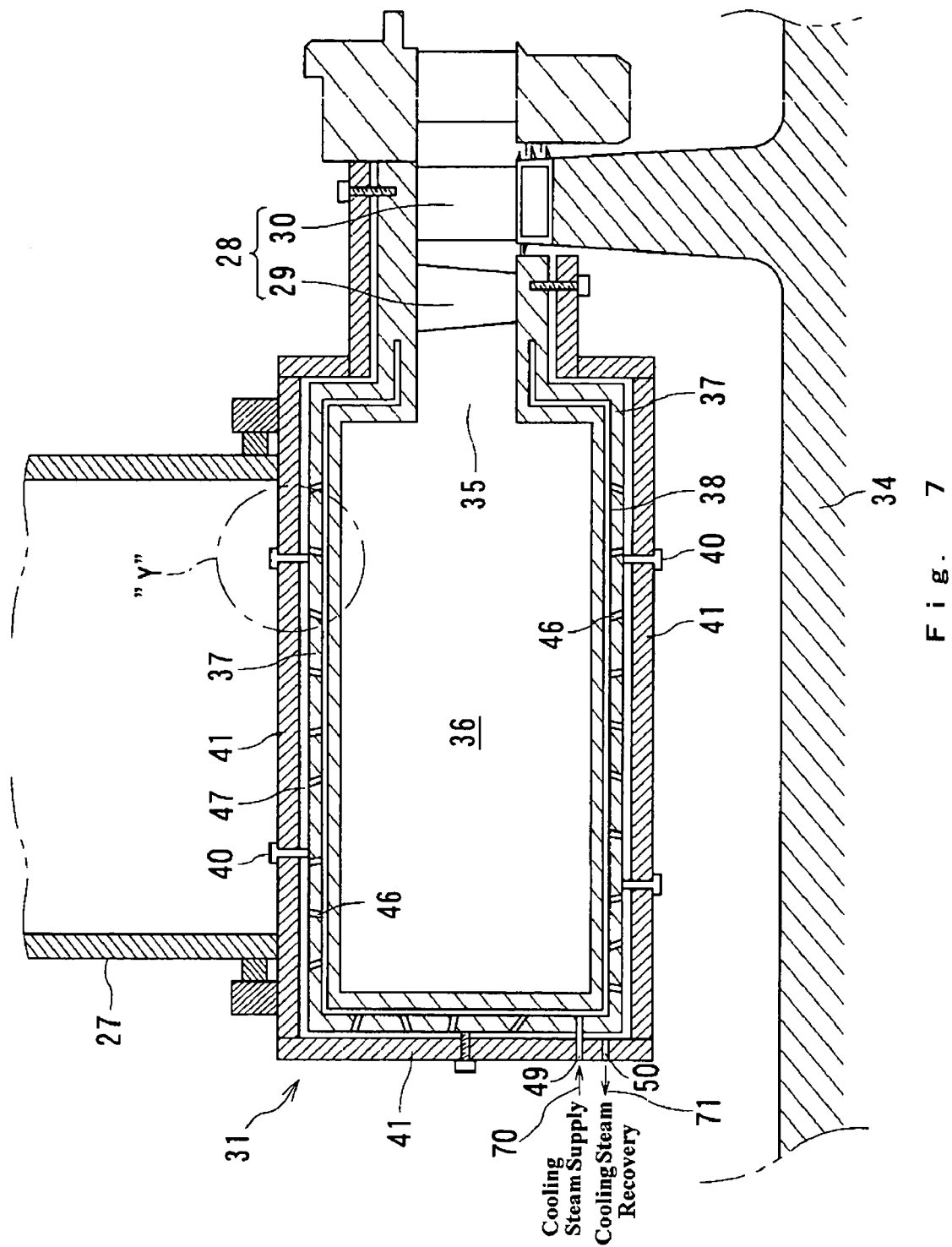
FIG. 7 is a schematic cross sectional view showing a further modification of a nozzle box according to the embodiment of the invention.

FIG. 7 is a schematic cross sectional view showing a modification of the nozzle box according to the embodiment of a steam turbine.

As shown in FIG. 7, cover plates 41 are arranged to enclose the outside of wall 37 of nozzle box 31. Cover plates 41 are also supported by a support 40 as shown in FIG. 2. Cooling steam outlet ports 46 are also provided in wall 37 to pass the cooling steam from cooling steam path 38 to a space 47 between wall 37 and cover plates 41. Cooling steam inlet 49, which supplies the cooling steam to cooling steam path 38, is provided in wall 37. A cooling steam outlet 50, which recovers the cooling steam from the space 47, is provided in a cover plate 41. Cooling steam supply line 70 is connected to cooling steam inlet 49 and a cooling steam recovery line 71 is connected to cooling steam outlet 50. With this modification, recovered cooling steam, which is the cooling steam as recovered after cooling wall 37 and cover plates 41, may be advantageously utilized for other constituent components of a steam turbine plant.

Figure 8:
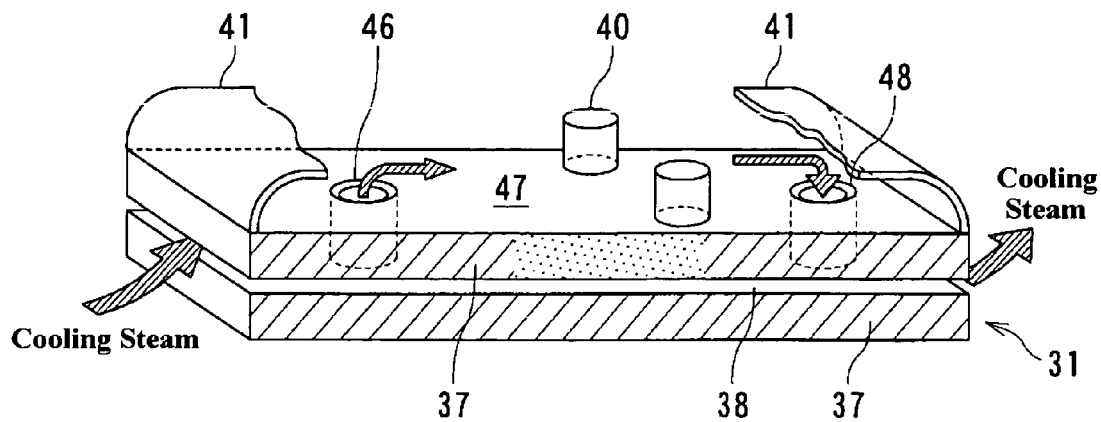
FIG. 8 is an enlarged schematic perspective view showing the nozzle box at portion "Y" of FIG. 7.
Figure 9:
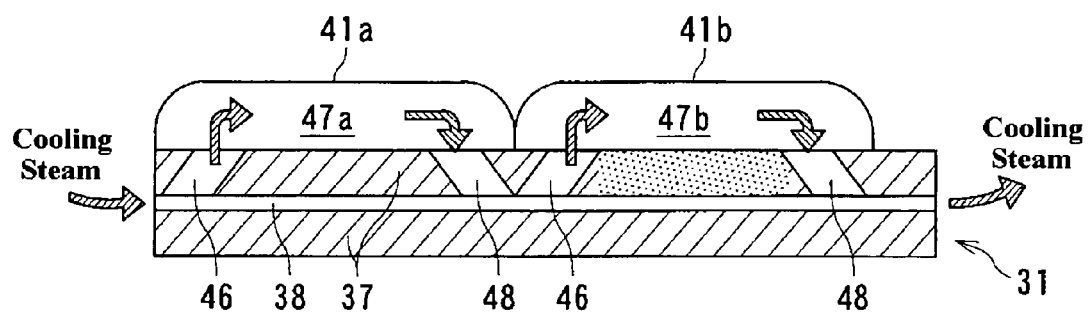
FIGS. 9 and 10 are enlarged schematic sectional views showing further modifications of the embodiment.

The FIG. 7 structure may be further modified as shown in FIG. 8. FIG. 8 is an enlarged schematic perspective view showing a corresponding portion "Y" of FIG. 7. As shown in FIG. 8, an exemplary cooling steam inlet port 48, which recovers the cooling steam from the space 47 and passes it into the cooling steam path 38, are provided in wall 37. The cooling steam inlet ports 48 are separate from, and form paths in conjunction with, cooling steam outlet ports 46.

Further, it may be modified to arrange a plurality of cover plates 41a, 41b, . . . 41n on whole area of the surface of the wall 37, where each cover plate 41a, 41b, . . . 41n encloses one of a divided space 47a, 47b, . . . 47n. In this case, at least one cooling steam inlet port 46 and at least one cooling steam outlet port 48 is preferably provided at each divided space 47*a*, 47*b*, . . . 47*n*. in the wall 37.

Figure 10:
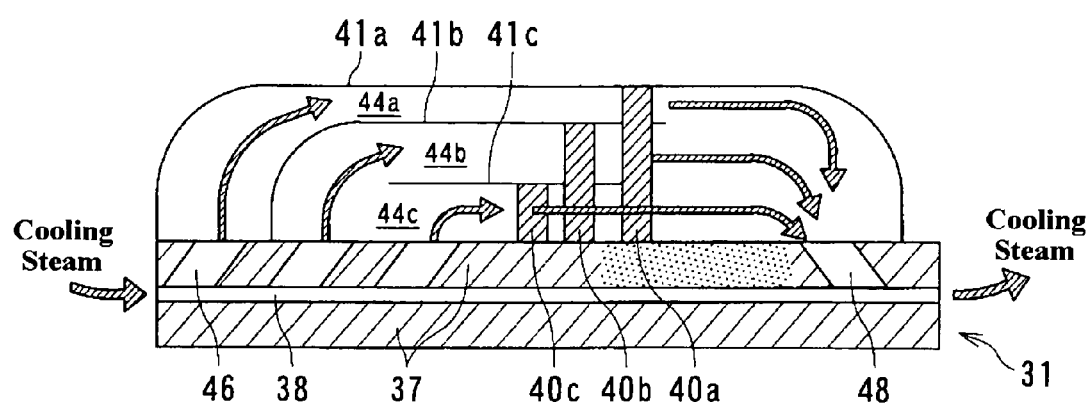

It may be further modified, as shown in FIG. 10, that the cover plates 41*c*, 41*b*, and 41*a* are arranged at gradually enlarged distances from the wall 37 from one side to the another by respective supports 40*c*, 40*b*, and 40*a*. This may form layers of the cover plates 41*c*, 41*b*, and 41*a*, which can be used as outside cooling steam paths 44*a*, 44*b* and 44*c* as the cooling steam from cooling steam outlet port 39 cools both face of cover plates 41*b* and 41*c*.

Figure 11:
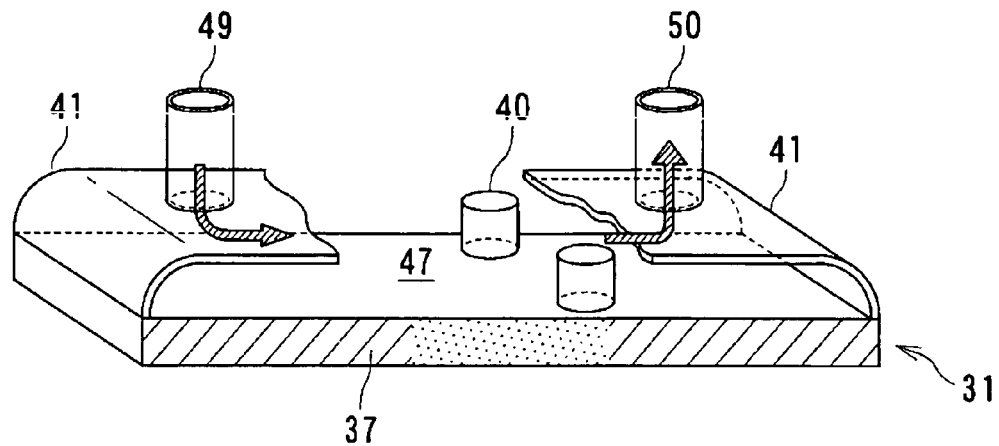
FIGS. 11 and 12 are enlarged schematic perspective views showing modifications of the embodiment.
Figure 12:
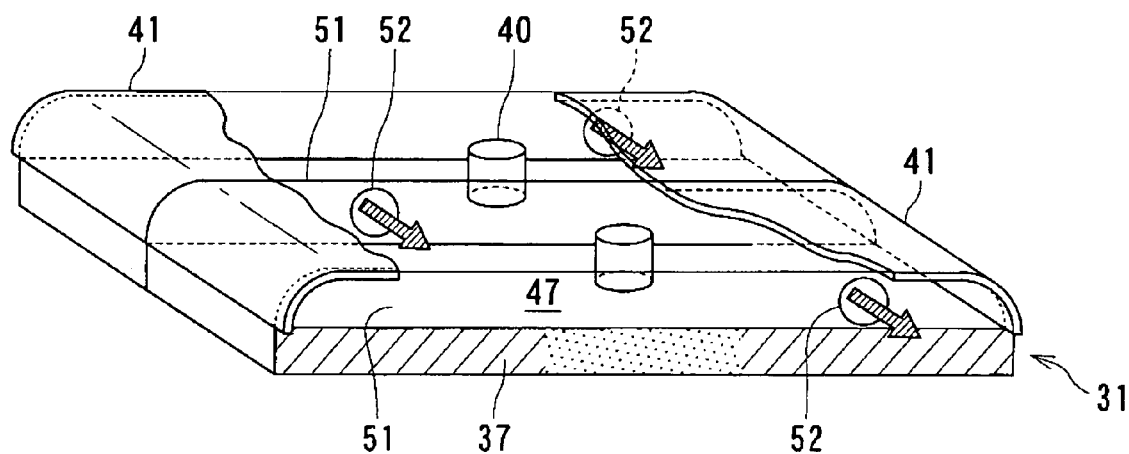

FIGS. 11 and 12 are enlarged schematic perspective views showing further modifications of the embodiment of the invention.

In this modification, cooling steam inlet 49, which supplies the cooling steam into the space 47, is provided in the cover plate 41 instead of the wall 37. This enables the cooling steam to be directly supplied to the space 47. Cooling steam outlet 50 is also provided in cover plate 41. Thought not shown in FIG. 11, a cooling steam path may be provided in the wall 37 of the nozzle box 31.

As shown in FIG. 12, partitions 51 may be provided to partition the inside the space 47. In this case, a steam pass opening 52 is provided in each partition 51 permits the cooling steam to flow throughout the space 47. At least two (2) partitions 51 are preferably provided so as to divide the space 47 into three (3) parts. In this case, the steam pass openings 52 are preferably offset in adjacent partitions 51, and at essentially at the same location between the first and third plates (and so on if more plates are used), as shown in FIG. 12. This causes the cooling steam to meander inside the space 47. Thus, the cooling steam may effectively cool cover plate 41 or wall 37 of nozzle box 31.

In addition, the partitions 51 and steam pass openings 52 may be applicable to any of the above-mentioned configurations, such as shown in FIG. 7, 8 or 10.

Figure 13:
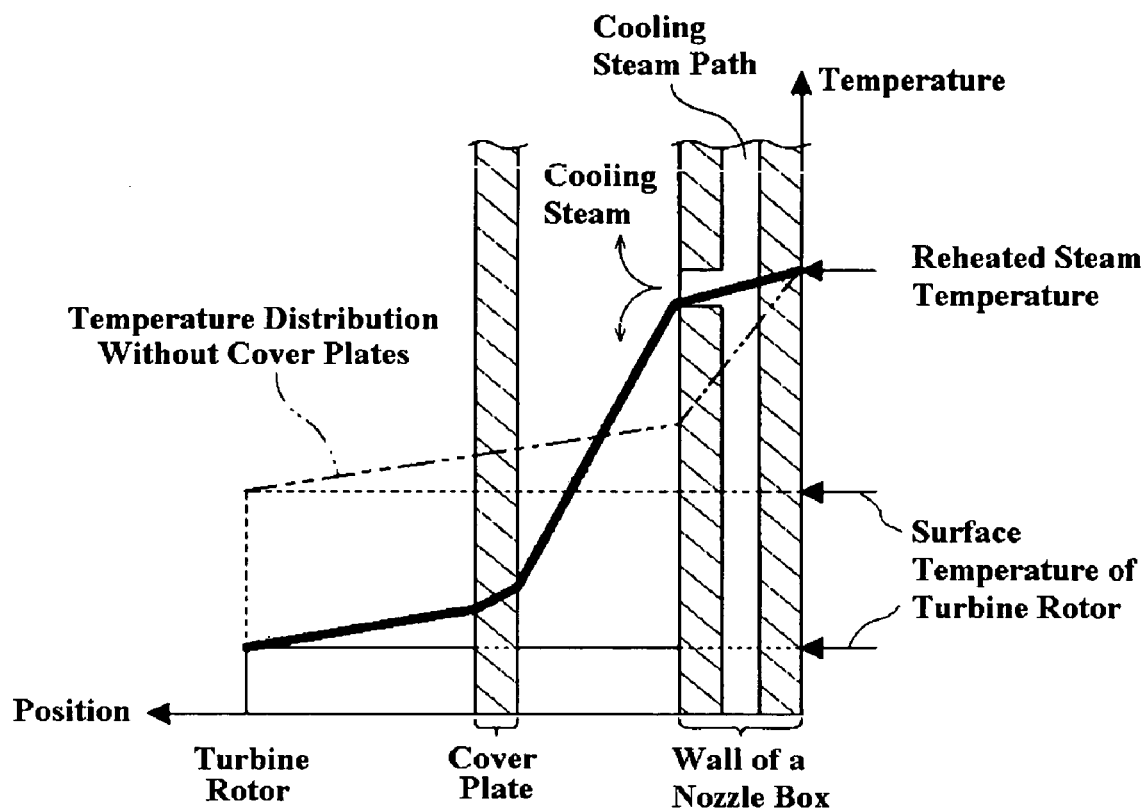
FIG. 13 is a chart comparing a temperature distribution between a nozzle box and a turbine rotor in a steam turbine according to the embodiment.

FIG. 13 is a chart of a temperature distribution between a nozzle box and a turbine rotor according to an embodiment. In FIG. 13, the difference in the temperature distribution by the existence of the cover plate is shown. The horizontal axis shows the different positions from inside of the wall of the nozzle box through to the outer surface of the turbine rotor. The vertical axis shows a temperature at the respective locations. A solid line shows the temperature distribution when the cover plates are provided, while a two-point dashed line shows the temperature distribution when the cover plates are not provided.

As shown in FIG. 13, the cover plates are shielding the heat from the high temperature steam supplied to the nozzle box. Thus, a surface temperature of the turbine rotor is lower when the cover plates are provided. This mitigates the heat stress on the turbine rotor.

As mentioned above, according to this embodiment, the nozzle box is effectively cooled by the cooling steam and the cover plates shield a heat transfer, such as a convection or a radiation, from the high temperature steam. Therefore, the steam turbine may effectively operate with the steam at the higher temperatures, while maintaining the strength of turbine constituent components, such as turbine rotor, despite the high temperature of the steam.

In the foregoing embodiment, the cooling steam is supplied to the nozzle box of a steam turbine. One exemplary supply of the cooling steam in steam turbine plant utilizing the foregoing steam turbine is explained below.

Figure 14:
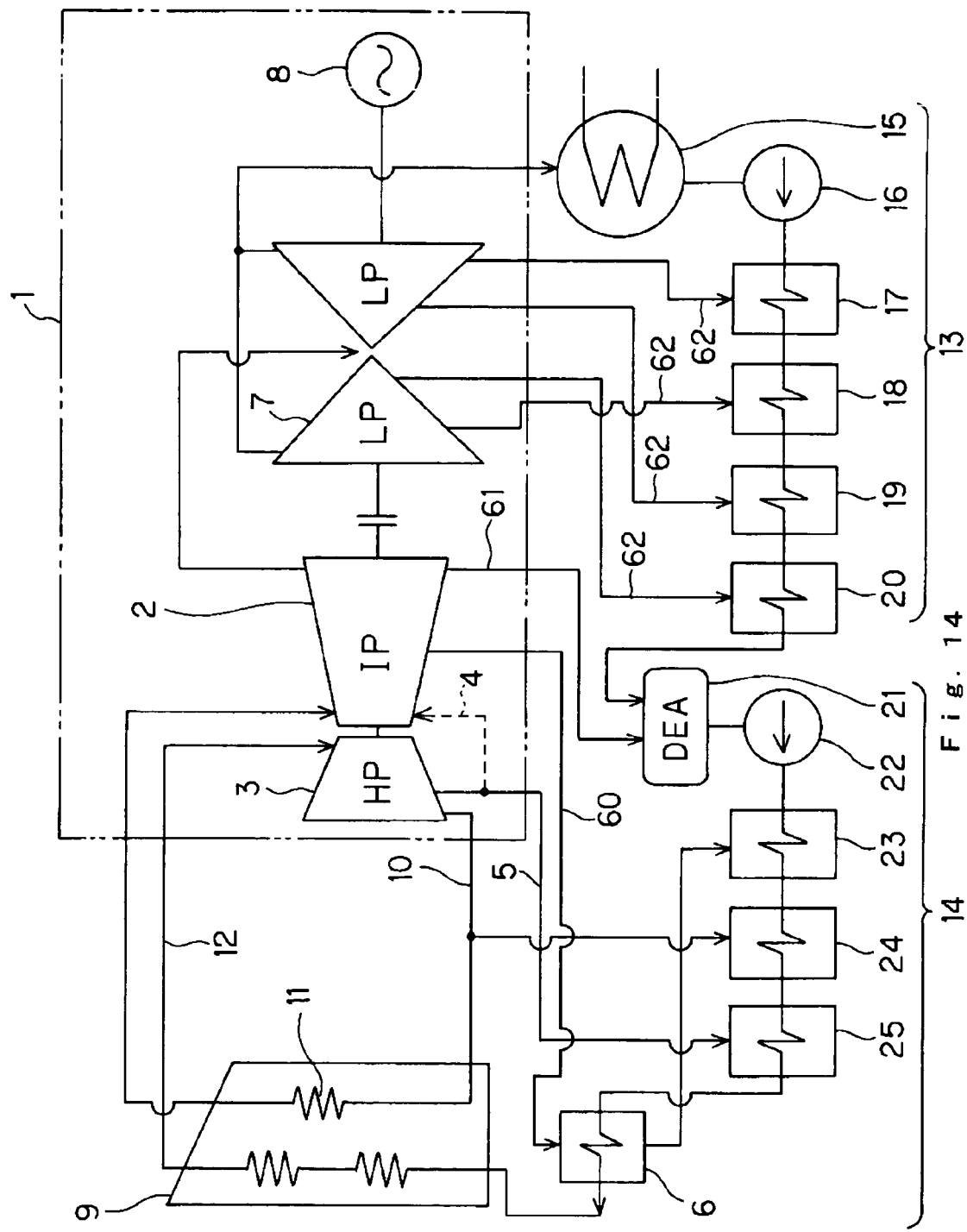
FIG. 14 is a schematic diagram of a example of a steam turbine plant that is suitable to adopt a steam turbine according to the embodiment of the invention.

FIG. 14 is a schematic diagram of a example of a steam turbine plant that is suitable to adopt a steam turbine of the embodiment. In FIG. 14, the steam turbine according to the embodiment is applied to the intermediate turbine, though it can be applied to any turbine.

A steam turbine plant includes a steam turbine 1, a boiler 9 as a steam generator, a condensate system 13 and a feedwater system 14.

Steam turbine 1 includes an intermediate pressure turbine 2, a high pressure turbine 3, a low pressure turbine 7 having a double-flow type configuration and a generator 8. Rotating shafts of those intermediate pressure turbine 2, high pressure turbine 3, low pressure turbine 7 and generator 8 are connected each other. The steam turbine 1 may have one rotating shaft as a whole.

Boiler 9, as a steam generator, produces high pressure main steam, which is supplied to high pressure turbine 3 through line 12. The main steam expands while it flows through the high pressure turbine 3, performing expansion work that drives high pressure turbine 3. A high pressure steam bleed line 5 is communicatively connected to high pressure turbine 3 at an intermediate stage of high pressure turbine 3, and bleeds steam from high pressure turbine 3.

The main steam expanded in high pressure turbine 3 is discharged from high pressure turbine 3 to a low temperature reheat line 10 as high pressure turbine discharged steam. The high pressure turbine discharged steam is supplied to boiler 9, reheated by a reheater 11 to produce reheated steam (another form of heated steam) having a temperature, for example, of about 1300 or more degrees Fahrenheit. The reheated steam is supplied to intermediate pressure turbine 2 so as to do expansion work and drive intermediate pressure turbine 2. A cooling steam supply line 4 is communicatively connected to intermediate pressure turbine 2 at a point relatively upstream of the intermediate pressure turbine 2. Cooling steam supply line 4 introduces part of the steam bled from the high pressure turbine 3 via high pressure steam bleed line 5 as a cooling steam in intermediate pressure turbine 2. Intermediate pressure steam bleed lines 60 and 61, which bleed steam from intermediate stages of intermediate pressure turbine 2, are connected to intermediate pressure turbine 2.

The reheated steam, as expanded in intermediate pressure turbine 2, is discharged from intermediate pressure turbine 2. This discharged steam is supplied to low pressure turbine 7, where it further expands to drive low pressure turbine 7. In this manner, high pressure turbine 3, intermediate pressure turbine 2, low pressure turbine 7 and generator 8 are all driven by steam. Low pressure steam bleed lines 62, which bleed steam from intermediate stages of low pressure turbine 7, are connected to low pressure turbine 7.

Condensate system 13 includes a condenser 15, a condensate pump 16, a first low pressure feedwater heater 17, a second low pressure feedwater heater 18, a third low pressure feedwater heater 19, and a fourth low pressure feedwater heater 20. Steam discharged from low pressure turbine 7 is introduced and condensed into condensate in condenser 15. The condensate is pumped by condensate pump 16 and flows through the low pressure feedwater heaters 17–20, in order, being heated with steam bled supplied from each of low pressure steam bleed lines 62 that are connected to low pressure turbine 7.

Feedwater system 14 includes a deaerator 21, a feedwater pump 22, a first high pressure feedwater heater 23, a second high pressure feedwater heater 24, a third high pressure feedwater heater 25 and a desuperheater 6 along the stream of the feedwater, downstream from the high pressure feedwater heaters 23–25. The condensate supplied from fourth low pressure feedwater heater 20 of the condensate system 13 is heated and deaerated using deaerator 21, where the heating source is steam bled from the intermediate pressure steam bleed line 61 on a relatively downstream part of intermediate pressure turbine 2. Feedwater is formed in this manner. Desuperheater 6 is arranged at the most downstream side of feedwater system 14. Desuperheater 6 heats feedwater heater using the sensible heat of steam bled in the intermediate pressure steam bleed line 60 connected to a relatively upstream part of intermediate pressure turbine 2. Such steam has a relatively high degree of superheat, as preferable for further heating the feedwater from the third high pressure feedwater heater 25 in feedwater system 14.

The feedwater is pumped by the feedwater pump 22. The water is heated by the first through third high pressure feedwater heaters 23, 24, and 25, in their respective order. The feedwater from third high pressure feedwater heater 25 is supplied to desuperheater 6, where it is further heated. First high pressure feedwater heater 23 uses steam flowing from desuperheater 6 as a heating source, which has taken the sensible heat from the steam in the intermediate pressure steam bleed line 60 and has been reduced to close to a saturation temperature in desuperheater 6. Second high pressure feedwater heater 24 uses discharged steam from high pressure turbine 3, through line 10, as a heating source. Third high pressure feedwater heater 25 uses steam bled from high pressure steam bleed line 5 connected to an intermediate stage of high pressure turbine 3. With this arrangement, the feedwater flowing through first high pressure feedwater heater 23 to desuperheater 6 is heated and returned as heated feedwater into the boiler 9.

As previously noted, the cooling steam is introduced into intermediate pressure turbine 2 from cooling steam supply line 4. The cooling steam is supplied to the nozzle box and cools the nozzle box and the cover plates by the configuration referred such as FIGS. 1 to 12.

In a example shown in FIG. 14, steam bled from high pressure turbine 3 is used for the cooling steam. Steam bled from intermediate pressure turbine 2, steam bled from boiler 9, or any other suitable steam may be used as the cooling steam. The source of the cooling steam may come from any part of the plant that can provide relatively cooler steam. As noted, the steam turbine according to the embodiment may be applied to high pressure turbine or any other suitable steam turbine.

Other embodiments of the present invention will be apparent to those skilled in the art from consideration of the specification and practice of the invention disclosed herein. For example, the specific nature and form of cooling passages through the various constituent component may differ, such as to avoid any extensive modification of the components to include particular cooling paths therethrough.

What is claimed is:

1. A steam turbine, comprising:
   a casing;
   a rotor rotatably installed in the casing and having a first space formed therebetween;
   a plurality of turbine stages disposed in the turbine, at least one of the turbine stages including a turbine nozzle and including a moving blade that is fixed to the rotor;
   a steam pass including the at least one turbine stage;
   a nozzle box, positioned in the first space between the casing and the rotor, for providing a heated steam to the steam pass,
   wherein the nozzle box includes at least one wall;
   at least one cover plate positioned adjacent to an outer surface of the nozzle box, to cover at least a portion of the nozzle box;
   a steam cooling path provided in the wall; and
   at least one cooling steam outlet port that traverses through the wall, to pass cooling steam inside the cooling steam path toward the cover plate.

2. A steam turbine according to claim 1,
   wherein the at least one cover plate extends essentially around the whole outer surface of the nozzle box.

3. A steam turbine according to claim 2, wherein the at least one cover plate comprises at least one cooling opening extending through the at least one cover plate.

4. A steam turbine according to claim 2, wherein the at least one cover plate comprises a plurality of cover plates, and
   wherein a cooling opening exists between at least two adjacent cover plates, the cooling opening for passing cooling steam.

5. A steam turbine according to claim 4,
   wherein the at least one cover plate including a plurality of plates,
   the plates spaced at different distance from the outer surface of the nozzle box.

6. A steam turbine according to claim 4, further comprising:
   a cooling steam inlet that supplies the cooling steam into a second space between the nozzle box and the at least one cover plate; and
   a cooling steam outlet that recovers the cooling steam from the second space.

7. A steam turbine according to claim 6, further comprising:
   a partition that divides the second space between the nozzle box and the at least one cover plate into at least two divided spaces.

8. A steam turbine according to claim 7, wherein each of the at least two divided spaces comprises:
   a cooling steam inlet formed in the at least one cover plate that supplies the cooling steam into the divided space; and
   a cooling steam outlet formed in the at least one cover plate that recover the cooling steam from the divided space.

9. A steam turbine according to claim 7, further comprising:
   a steam pass opening provided in the partition.

10. A steam turbine according to claim 9,
    wherein the partition comprises multiple partitions, each of the partitions having a steam pass opening, the respective steam pass openings arranged so that the cooling steam meanders inside the second space between the nozzle box and the at least one cover plate.

11. A steam turbine according to claim 4, wherein the nozzle box includes a wall, further comprising:
    a steam cooling path provided in the wall;
    at least one cooling steam outlet port that traverses through the wall to pass cooling steam inside the cooling steam path toward the at least one cover plate;
    a partition that divides a second space between the nozzle box and the at least one cover plate into at least two divided spaces; and
    a steam pass opening provided in the partition.

12. A steam turbine according to claim 11, further comprising:
    wherein the partition comprises multiple partitions, each of the partitions having a steam pass opening, the respective steam pass openings arranged so that the cooling steam meanders inside the second space between the nozzle box and the at least one cover plate.

13. A steam turbine according to claim 1, wherein the at least one cover plate extends around the whole outer surface of the nozzle box.

14. A steam turbine according to claim 13, wherein the nozzle box includes at least one wall, further comprising:
a steam cooling path provided in the wall;
at least one cooling steam outlet port that traverses through the wall, to pass a cooling steam inside the cooling steam path toward the at least one cover plate;
a cooling steam inlet that supplies the cooling steam into the cooling steam path; and
a cooling steam outlet that recovers the cooling steam that has passed through a second space between the nozzle box and the at least one cover plate.

15. A steam turbine according to claim 13, further comprising:
a partition that divides a second space between the nozzle box and the at least one cover plate into at least two divided spaces;
wherein each of the at least two divided spaces comprises:
a cooling steam inlet that supplies the cooling steam into the divided space; and
a cooling steam outlet that recover the cooling steam from the divided space.

16. A steam turbine according to claim 13, wherein the nozzle box includes at least one wall, further comprising:
a steam cooling path provided in the wall;
at least one cooling steam outlet port that traverses through the wall, to pass a cooling steam in the cooling steam path toward a second space between the nozzle box and the at least one cover plate; and
a cooling steam inlet port that recovers the cooling steam from the second space between the wall and the at least one cover plate to flow into the cooling steam path.

17. A steam turbine according to claim 16, further comprising:
a partition that divides the second space between the wall and the at least one cover plate into at least two divided spaces;
wherein each of the at least two divided spaces comprises:
a cooling steam inlet that supplies the cooling steam into the divided space; and
a cooling steam outlet that recover the cooling steam from the divided space.

18. A steam turbine according to claim 16, wherein the at least one cover plate comprises a plurality of cover plates, each of the cover plates being shaped to enclose a respective second space between the wall and the respective cover plate,
wherein each respective second space between the wall and the respective cover plate comprises:
at least one cooling steam outlet port that traverses through the wall, to pass a cooling steam in the cooling steam path toward the respective second space; and
a cooling steam inlet port that traverses the wall, to recover cooling steam from the respective second space between the wall and the respective cover plate to flow into the cooling steam path.

19. A steam turbine according to claim 18, wherein each respective second space between the wall and the respective cover plate comprises partitions, to create multiple flow paths for the cooling steam from the cooling steam outlet port toward the cooling steam inlet port.

20. A steam turbine according to claim 1, wherein the at least one cover plate is a flat plate.

21. A steam turbine according to claim 1, further comprising:
a support connected to the at least one cover plate, wherein the support fixes the at least one cover plate at a predetermined distance from the outer surface of the nozzle box.

22. A steam turbine according to claim 1, wherein the at least one cover plate comprises a plurality of cover plates, wherein at least two cover plates are spaced from each other and at least partially overlap with one another relative to the outer surface of the nozzle box.

23. A steam turbine, comprising:
a casing;
a rotor rotatably installed in the casing and having a first space formed therebetween;
a plurality of turbine stages disposed in the turbine, at least one of the turbine stages including a turbine nozzle and including a moving blade that is fixed to the rotor;
a steam pass including the at least one turbine stage;
a nozzle box, positioned in the first space between the casing and the rotor, for providing a heated steam to the steam pass; and
at least one cover plate positioned adjacent to an outer surface of the nozzle box, to cover at least a portion of the nozzle box,
wherein the at least one cover plate is a wave-shaped plate.

24. A steam turbine, comprising:
a casing;
a rotor rotatably installed in the casing and having a first space formed therebetween;
a plurality of turbine stages disposed in the turbine, at least one of the turbine stages including a turbine nozzle and including a moving blade that is fixed to the rotor;
a steam pass including the at least one turbine stage;
a nozzle box, positioned in the first space between the casing and the rotor, for providing a heated steam to the steam pass;
at least one cover plate positioned adjacent to an outer surface of the nozzle box, to cover at least a portion of the nozzle box; and
a support connected to the at least one cover plate, wherein the support fixes the at least one cover plate at a predetermined distance from the outer surface of the nozzle box to form a second space between the at least one cover plate and the nozzle plate, and cooling steam is permitted to flow in the second space.

25. A steam turbine according to claim 24, wherein the at least one cover plate comprises a plurality of cover plates, wherein at least two cover plates are positioned at different relative distances to the outer surface of the nozzle plate.

26. A steam turbine according to claim 25, wherein the at least two cover plates at least partially overlap with one another relative to the outer surface of the nozzle box, and an additional cooling steam path is formed between the at least two cover plates for cooling steam to flow in parallel to the cooling steam flowing in the second space.

* * * * *